(12) United States Patent
Hagiwara

(10) Patent No.: US 8,218,238 B2
(45) Date of Patent: Jul. 10, 2012

(54) ZOOM LENS SYSTEM AND IMAGE TAKING APPARATUS INCLUDING THE SAME

(75) Inventor: Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/749,396

(22) Filed: Mar. 29, 2010

(65) Prior Publication Data

US 2010/0246002 A1 Sep. 30, 2010

(30) Foreign Application Priority Data

Mar. 31, 2009 (JP) ................................. 2009-085556

(51) Int. Cl.
*G02B 27/64* (2006.01)
*G02B 15/14* (2006.01)

(52) U.S. Cl. ......... 359/557; 359/554; 359/676; 359/687

(58) Field of Classification Search .......... 359/554–557, 359/676, 686–687
See application file for complete search history.

(56) References Cited

U.S. PATENT DOCUMENTS

| 6,606,194 B2 * | 8/2003 | Hamano et al. ............... 359/557 |
| 7,227,699 B2 * | 6/2007 | Hamano et al. ............... 359/687 |
| 2009/0316266 A1 * | 12/2009 | Shinohara ..................... 359/557 |

FOREIGN PATENT DOCUMENTS

| JP | H07-128619 A | 5/1995 |
| JP | 2002-244037 A | 8/2002 |
| JP | 2003-322795 A | 11/2003 |

\* cited by examiner

*Primary Examiner* — Thong Nguyen

(74) *Attorney, Agent, or Firm* — Canon U.S.A., Inc. IP Division

(57) ABSTRACT

Provided is a zoom lens system includes, in order from an object side to an image side: a first lens unit having a positive refractive power; a second lens unit having a negative refractive power; a third lens unit having a positive refractive power; and a fourth lens unit having a positive refractive power, the second and fourth lens units move on an optical axis during zooming. The third lens unit includes, in order from the object side to the image side: a third A lens unit having a negative refractive power; and a third B lens unit having a positive refractive power, the third B lens unit including a positive lens and a negative lens being joined together. When curvature radii of surfaces of the cemented lens on the object side and the image side are R3A and R3B, respectively, the following condition is satisfied: $5 < |(R3A+R3B)/(R3A-R3B)| < 30$.

5 Claims, 11 Drawing Sheets

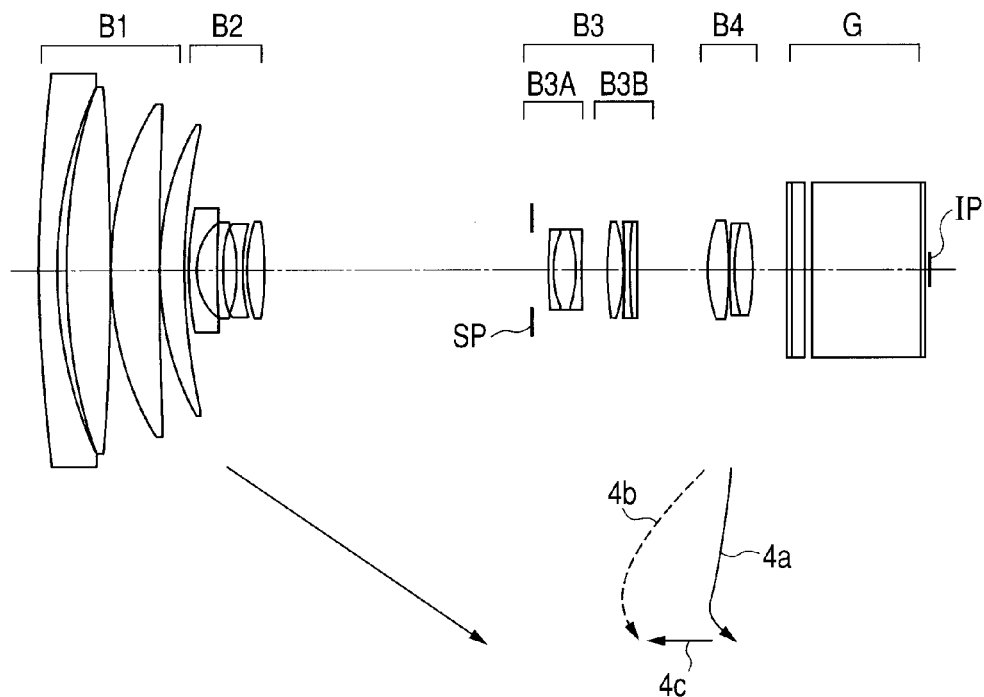
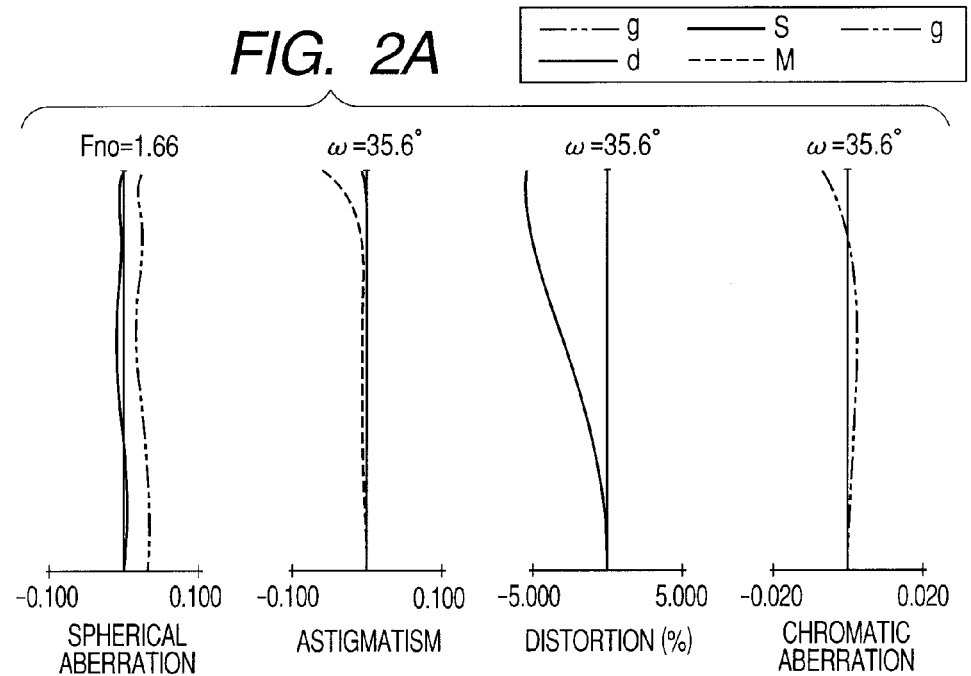

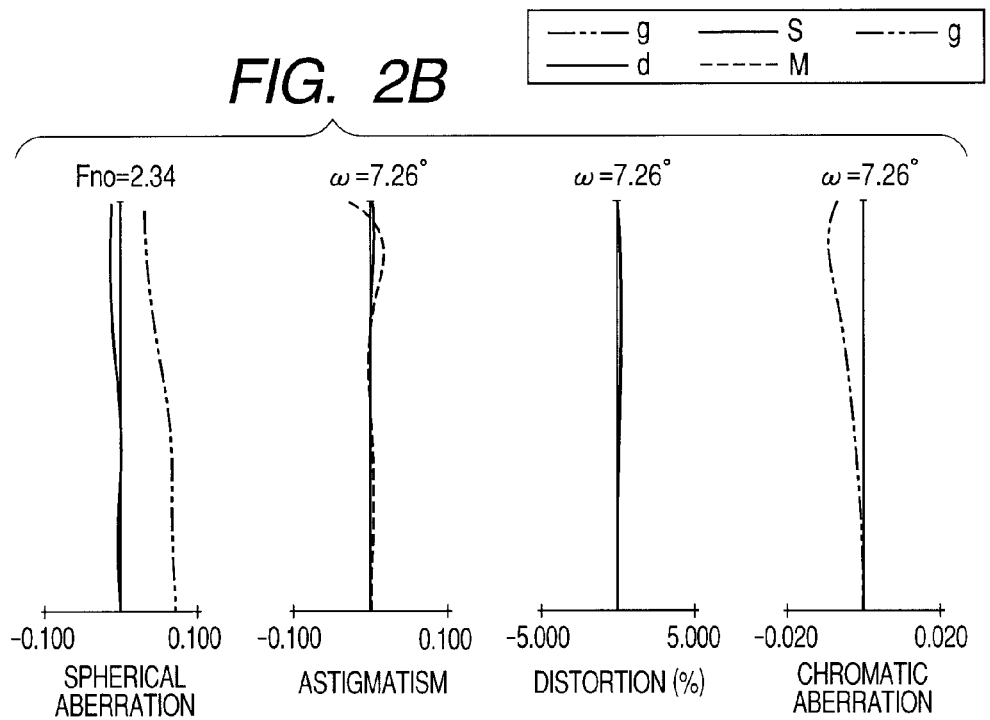
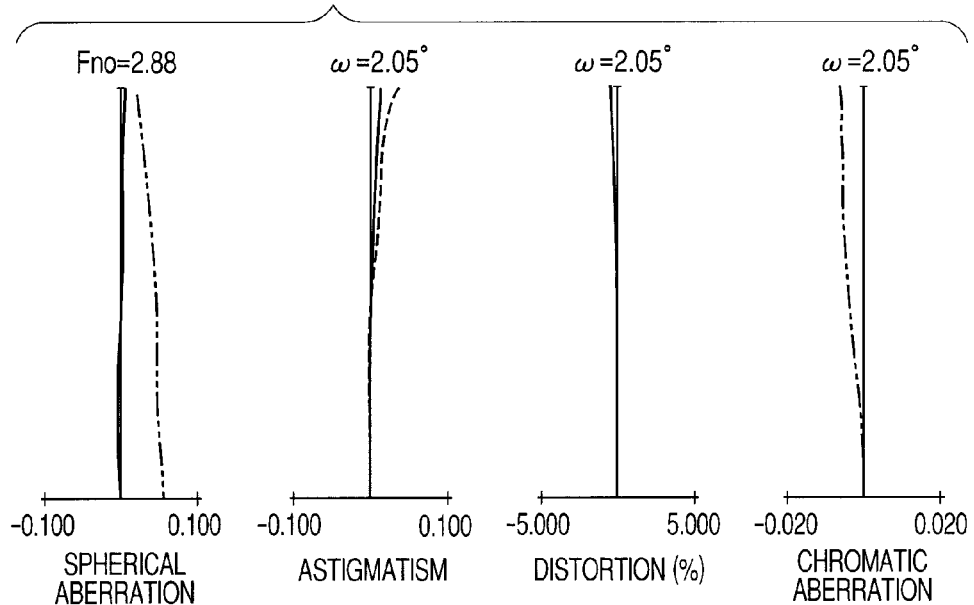

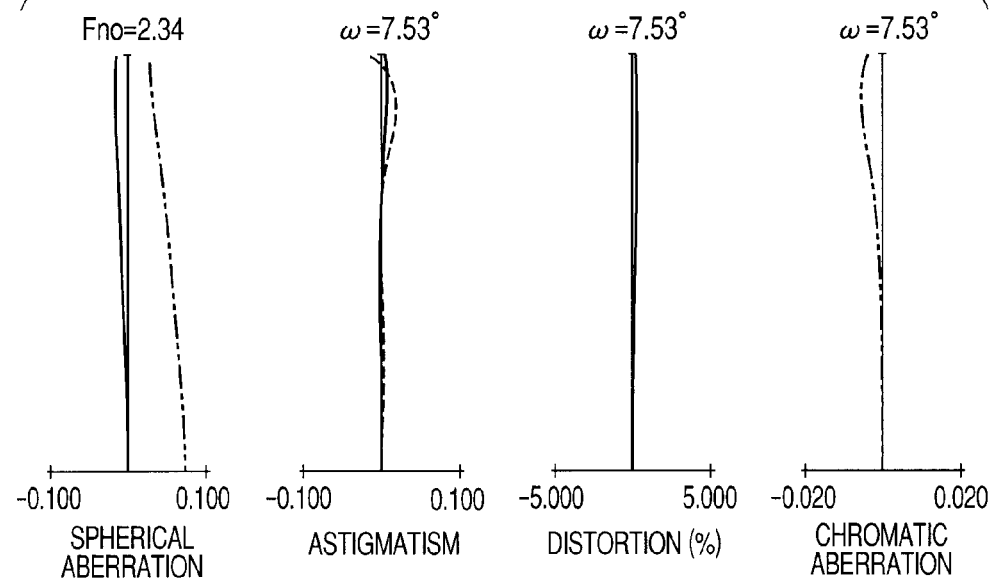
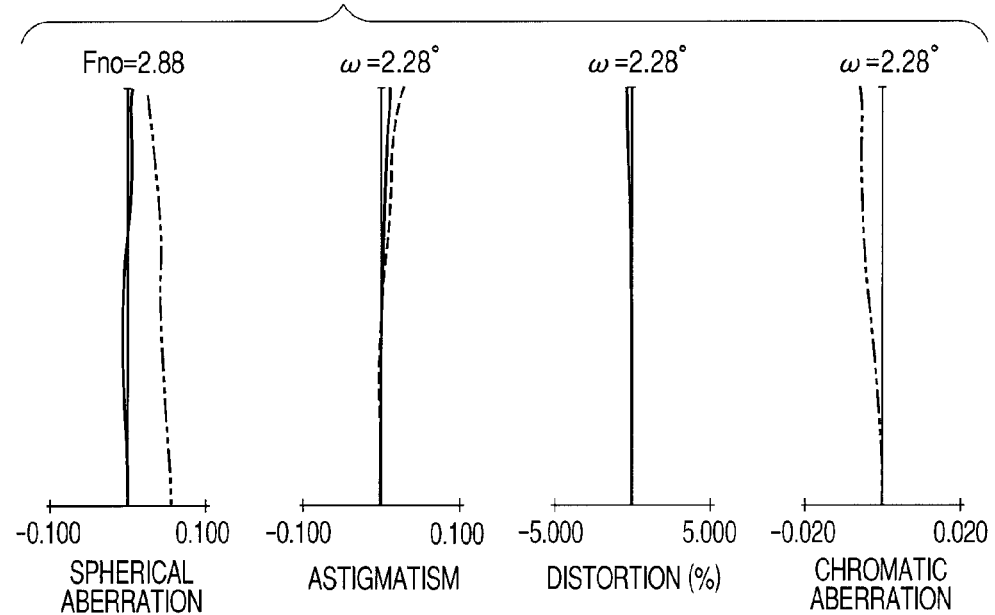

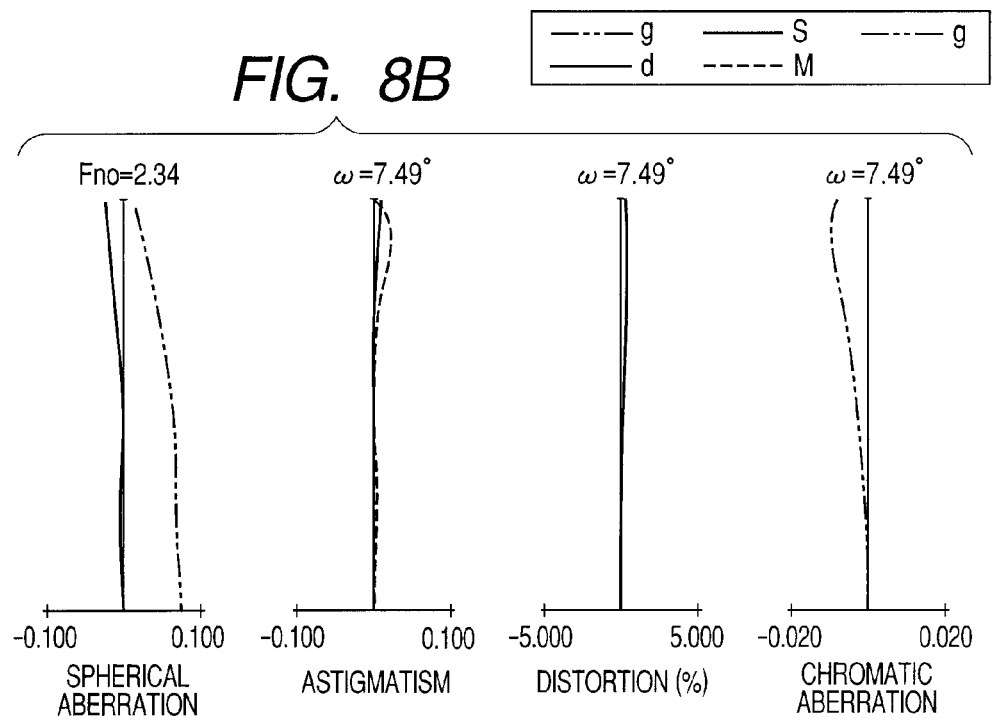
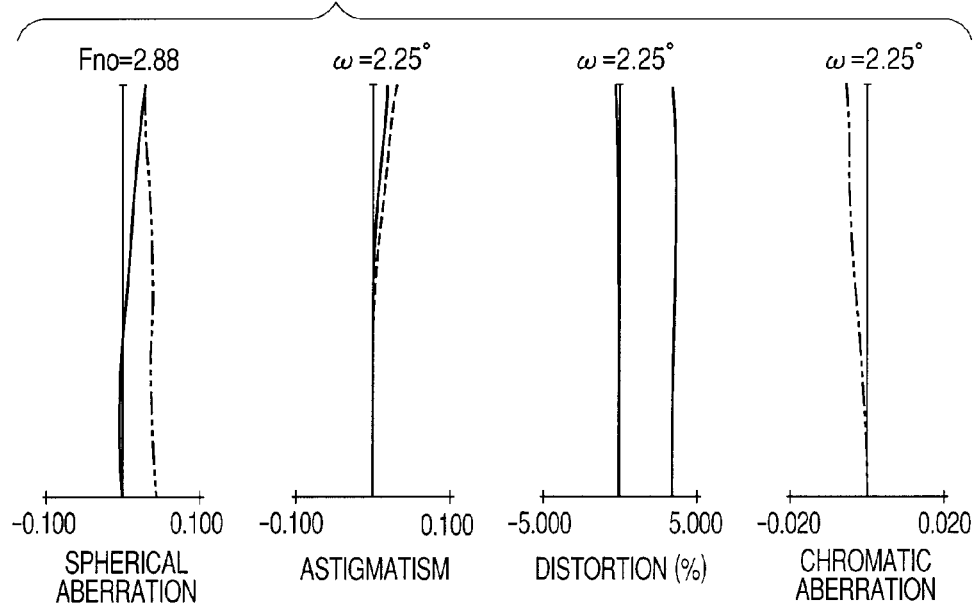

ZOOM LENS SYSTEM AND IMAGE TAKING APPARATUS INCLUDING THE SAME

BACKGROUND OF THE INVENTION

1. Field of the Invention

The present invention relates to a zoom lens system and an image taking apparatus including the zoom lens system, and more particularly, to a zoom lens system and an image taking apparatus including the zoom lens system, which are suitable for a video camera, a silver-halide camera, a digital camera, a TV camera, or a monitoring camera.

2. Description of the Related Art

In recent years, zoom lens systems having a small F-number (Fno), a wide field angle, a compact size, a high zoom ratio, and a high resolution are demanded as photographing optical systems for use in image taking apparatuses such as video cameras or digital still cameras, using a solid state image pickup element. Further, the zoom lens systems are demanded to provide an image stabilizing function for preventing a blur of a photographed image.

In order to satisfy all of the above-mentioned demands, the photographing optical system is increased in size, and the weight of the entire apparatus is increased. For example, when the optical component that performs image stabilization is increased in size, a drive section having a large drive force must be applied in order to operate the optical component, and the image stabilizing system including the drive section is increased in size to increase the weight of the entire apparatus. In addition, a response of an image stabilizing operation is deteriorated.

For the image stabilization, when a lens unit which is a part of the zoom lens system is moved in a direction perpendicular to an optical axis, a decentering aberration occurs, and hence optical performance is liable to be deteriorated.

Accordingly, it is important that, in the zoom lens system having an image stabilizing mechanism, the lens unit for lens stabilization is small in size and light in weight, and the deterioration of the optical performance due to image stabilization is low.

There is a zoom lens system including four lens units each having positive, negative, positive, and positive refractive powers which are arranged in order from an object side to an image side. There has been known the four-unit zoom lens systems in which the second and fourth lens units are moved during zooming, and a part of the lens units is moved to correct image blur. Among those zoom lens systems, there has been known zoom lens systems in which the third lens unit is divided into a lens unit having a negative refractive power and a lens unit having a positive refractive power, and the lens unit having a positive refractive power is moved in a direction perpendicular to the optical axis to correct the image blur (Japanese Patent Application Laid-Open No. H07-128619, U.S. Pat. No. 6,606,194, Japanese Patent Application Laid-Open No. 2002-244037, and Japanese Patent Application Laid-Open No. 2003-322795).

SUMMARY OF THE INVENTION

According to an aspect of the present invention, a zoom lens system includes, in order from an object side to an image side: a first lens unit having a positive refractive power; a second lens unit having a negative refractive power; a third lens unit having a positive refractive power; and a fourth lens unit having a positive refractive power, the second lens unit and the fourth lens unit move on an optical axis during zooming, in which: the third lens unit includes, in order from the object side to the image side: a third A lens unit having a negative refractive power; and a third B lens unit having a positive refractive power which moves in a direction having a component in a direction perpendicular to the optical axis for moving an imaging position; the third B lens unit includes a cemented lens in which a positive lens and a negative lens are joined together; and when curvature radii of surfaces of the cemented lens on the object side and the image side are R3A and R3B, respectively, the following condition is satisfied $$5<|(R3A+R3B)/(R3A-R3B)|<30.$$

According to another aspect the present invention, a zoom lens system includes, in order from an object side to an image side: a first lens unit having a positive refractive power; a second lens unit having a negative refractive power; a third lens unit having a positive refractive power; and a fourth lens unit having a positive refractive power, the second lens unit and the fourth lens unit move on an optical axis during zooming, in which: the third lens unit includes, in order from the object side to the image side: a third A lens unit having a negative refractive power; and a third B lens unit having a positive refractive power which moves in a direction having a component in a direction perpendicular to the optical axis for moving an imaging position; the third B lens unit includes at least one positive lens, and a negative lens, and includes an aperture stop on the object side of the third A lens unit; and when an aperture diameter of the aperture stop at an open F-number at a wide angle end is Spa, a total thickness of the positive lenses configuring the third B lens unit is Dp, and a total of lens thicknesses at a height from the optical axis of a half of the aperture diameter of the aperture stop at the open F-number of the negative lens that configures the third B lens unit at the wide angle end is Kn, the following condition is satisfied $$0.4<(Dp+Kn)/Spa<0.7.$$

According to the present invention, there may be provided a compact zoom lens system that is high in zoom ratio, and high in optical performance over all of the zoom range. Further, according to the present invention, there is provided a zoom lens system that is small in decentering aberration when the lens unit for image stabilization is decentered and high in optical performance, while downsizing the lens unit for image stabilization.

Further features of the present invention will become apparent from the following description of exemplary embodiments with reference to the attached drawings.

BRIEF DESCRIPTION OF THE DRAWINGS

FIG. 1 is a lens sectional diagram at a wide angle end of a zoom lens system according to a first embodiment of the present invention.

FIGS. 2A, 2B and 2C are aberration diagrams of the zoom lens system of the first embodiment of the present invention.

FIGS. 6A, 6B and 6C are aberration diagrams of the zoom lens system of the third embodiment of the present invention.

FIGS. 8A, 8B and 8C are aberration diagrams of the fourth embodiment of the present invention.

DESCRIPTION OF THE EMBODIMENTS

A zoom lens system and an image taking apparatus including the zoom lens system according to embodiments of the present invention are described below with reference to the accompanying drawings. The zoom lens system according to the present invention includes a first lens unit having a positive refractive power, a second lens unit having a negative refractive power, a third lens unit having a positive refractive power, and a fourth lens unit having a positive refractive power, which are arranged in order from an object side to an image side. During zooming, the second lens unit and the fourth lens unit move on an optical axis. The third lens unit includes a third A lens unit having a negative refractive power, and a third B lens unit (image stabilizing lens unit) having a positive refractive power which is moved in a direction having a component in a direction perpendicular to the optical axis for moving an imaging position.

Figure 3:
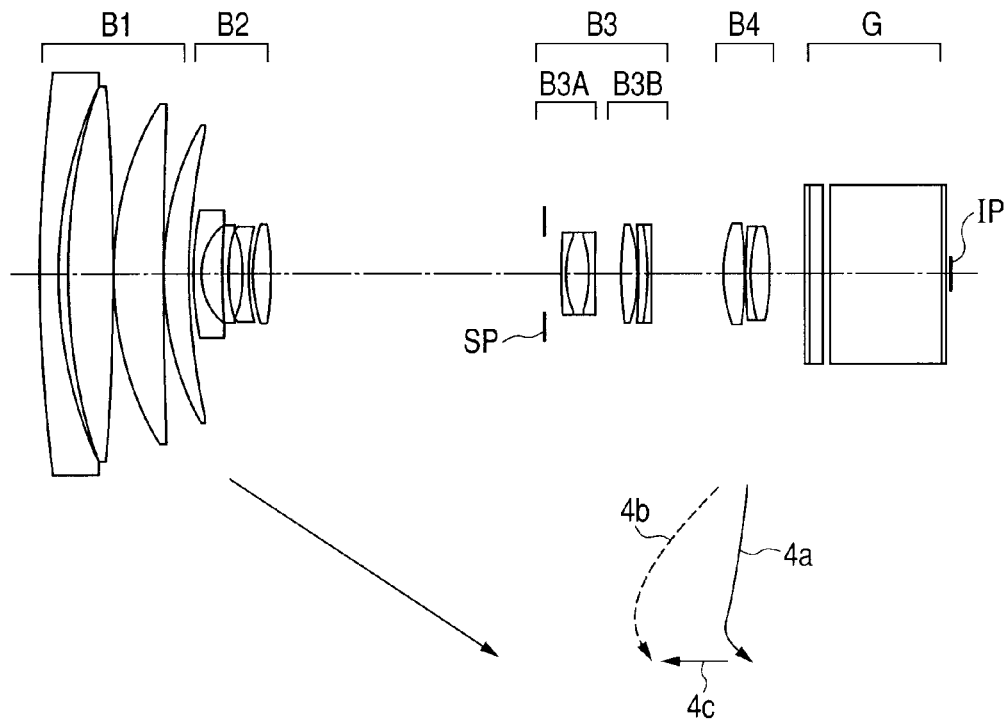
FIG. 3 is a lens sectional diagram at a wide angle end of a zoom lens system according to a second embodiment of the present invention.
Figure 4A:
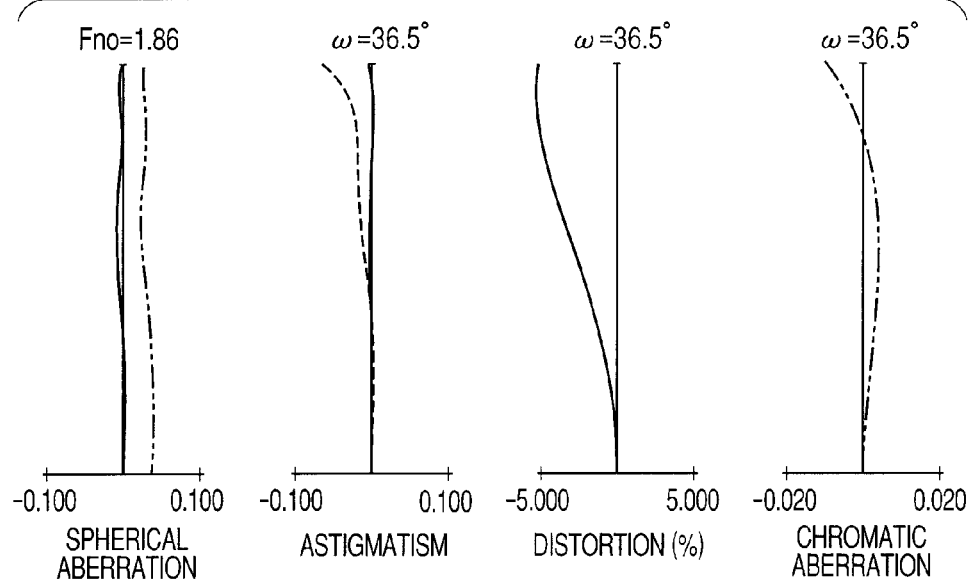
FIGS. 4A, 4B and 4C are aberration diagrams of the zoom lens system of the second embodiment of the present invention.
Figure 4B:
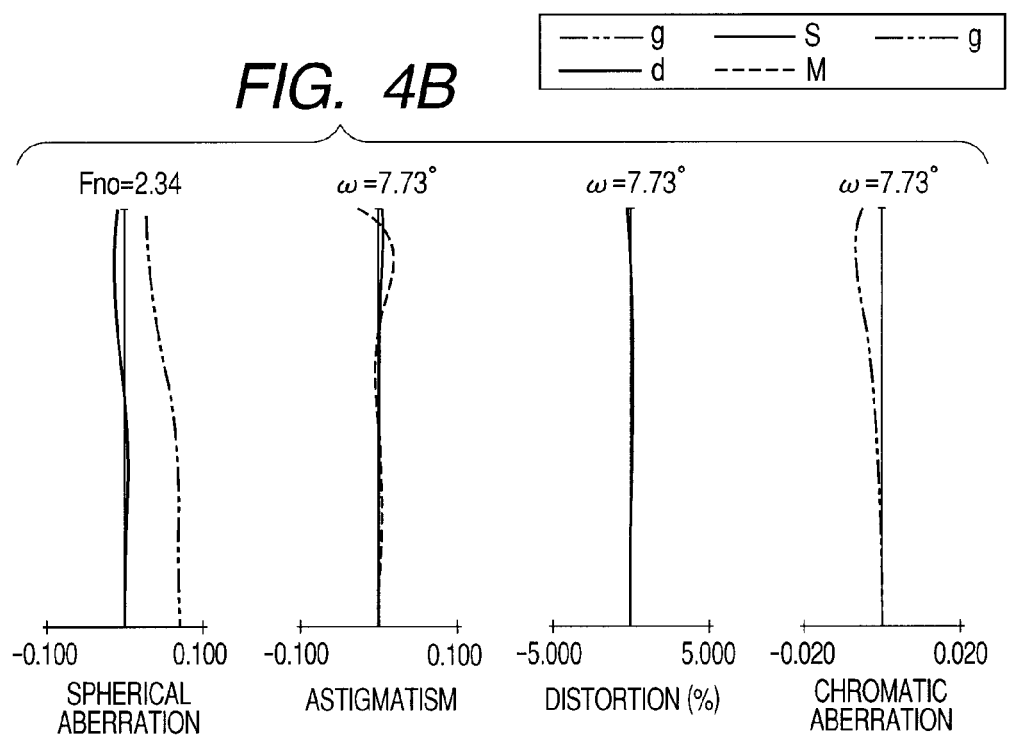
Figure 4C:
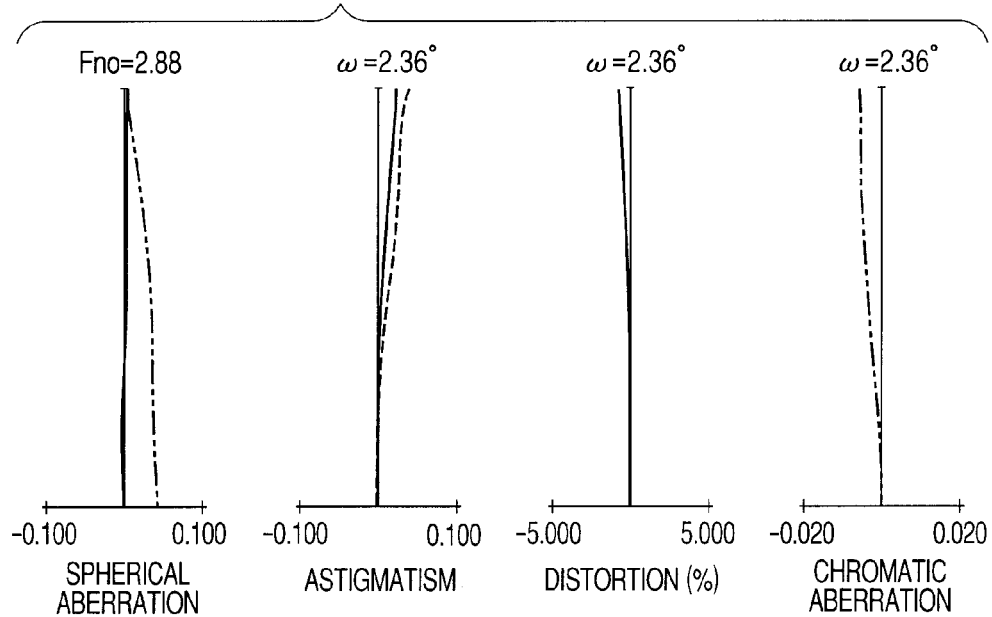
Figure 5:
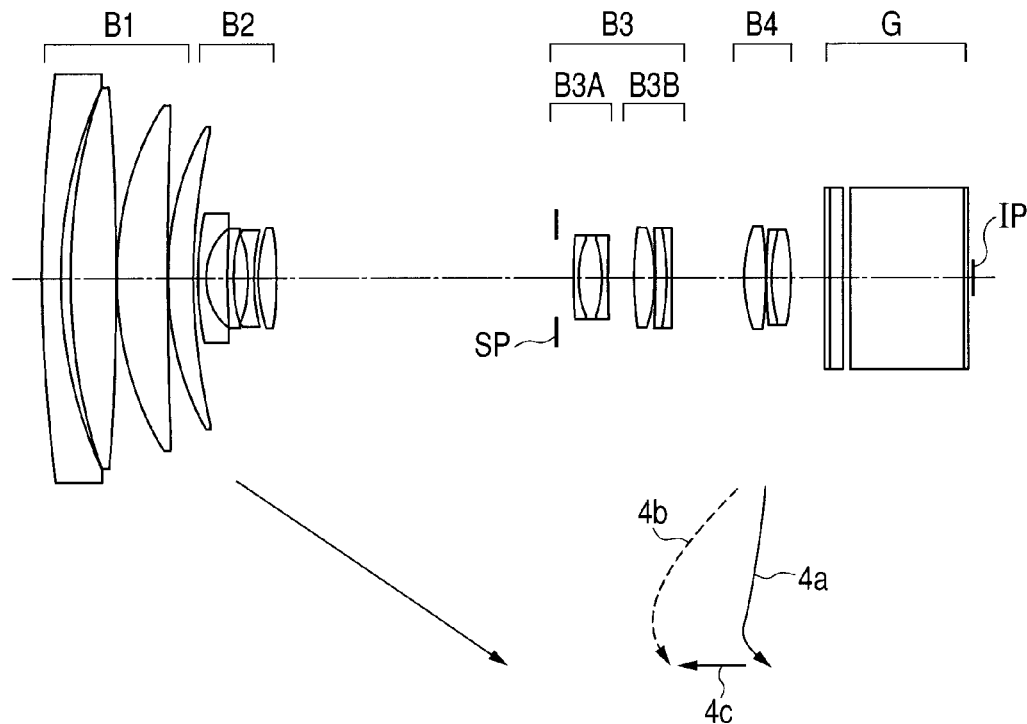
FIG. 5 is a lens sectional diagram at a wide angle end of a zoom lens system according to a third embodiment of the present invention.
Figure 6A:
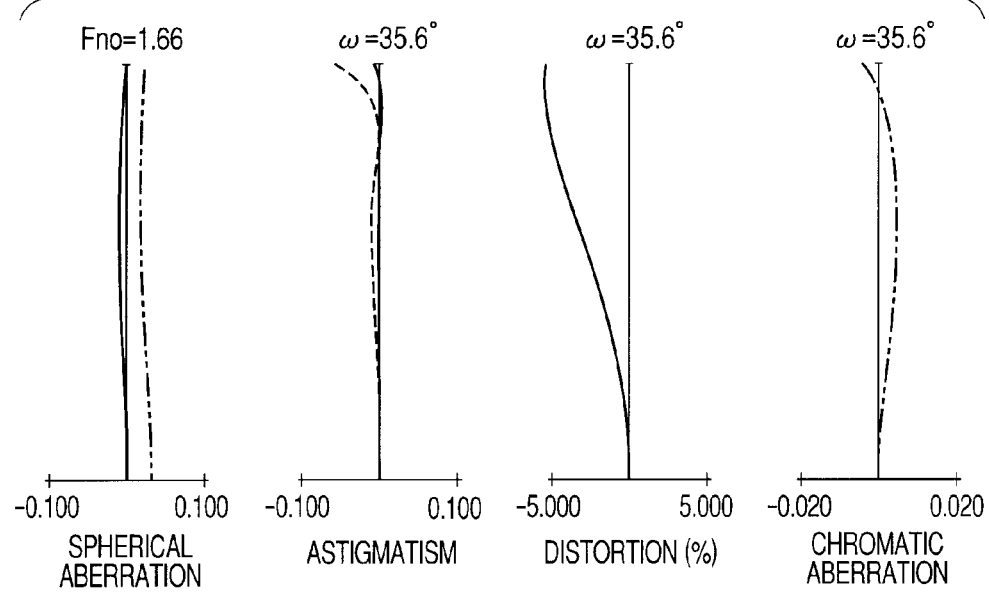
Figure 7:
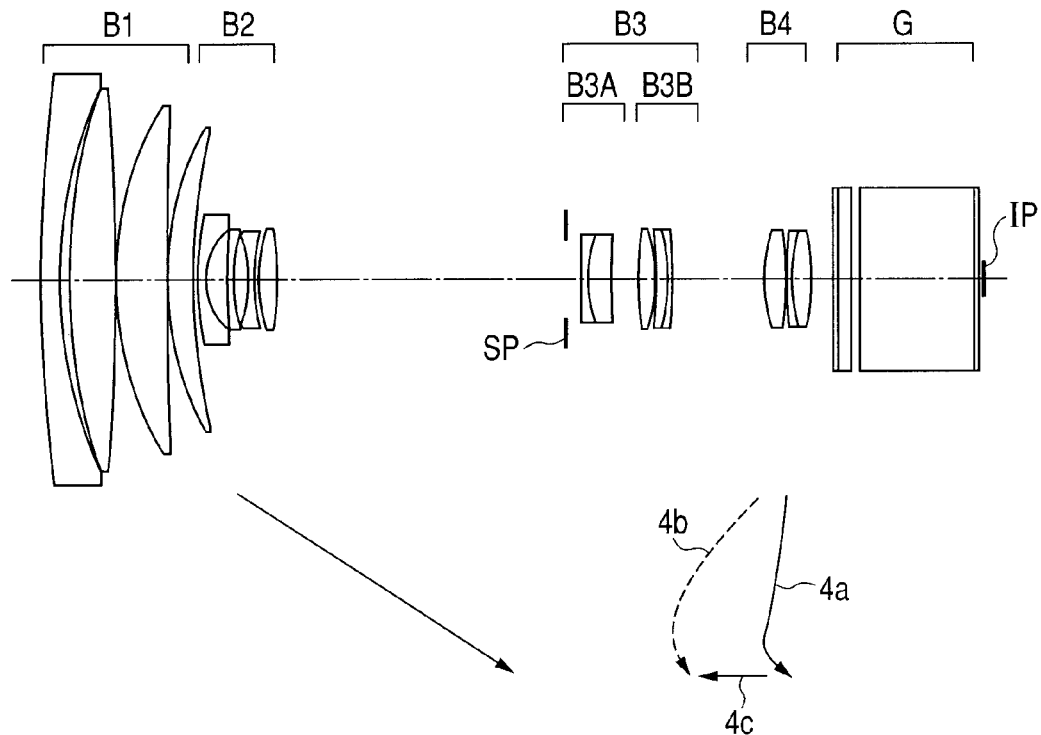
FIG. 7 is a lens sectional diagram at a wide angle end of a zoom lens system according to a fourth embodiment of the present invention.
Figure 8A:
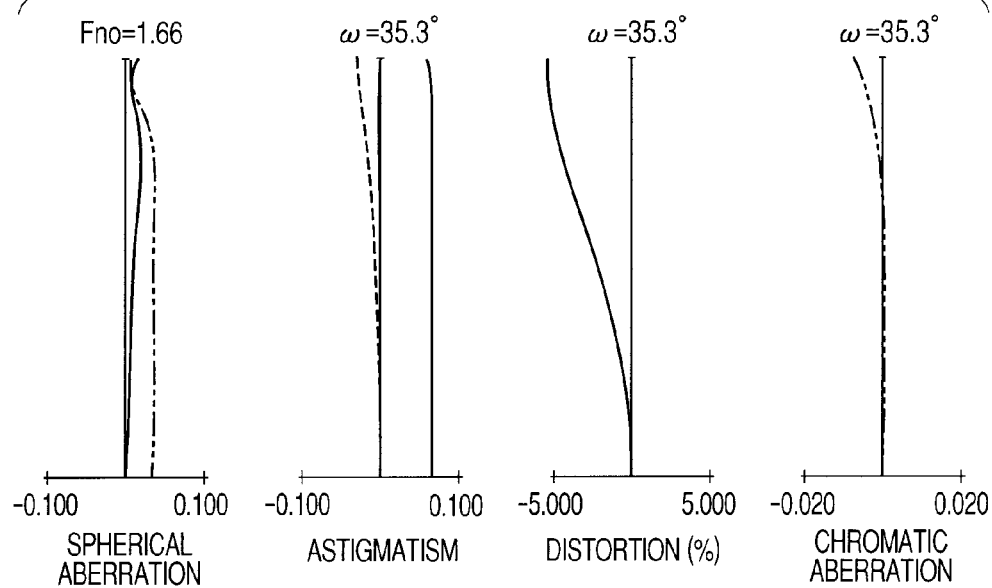
Figure 9:
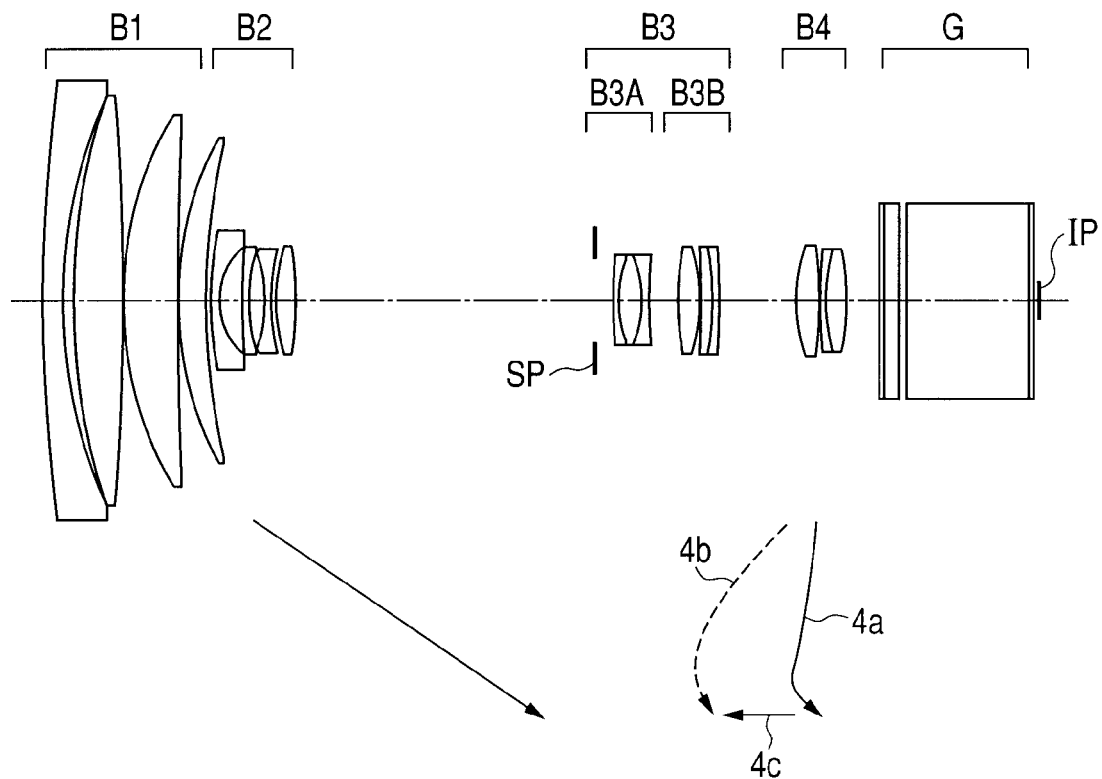
FIG. 9 is a lens sectional diagram at a wide angle end of a zoom lens system according to a fifth embodiment of the present invention.
Figure 10A:
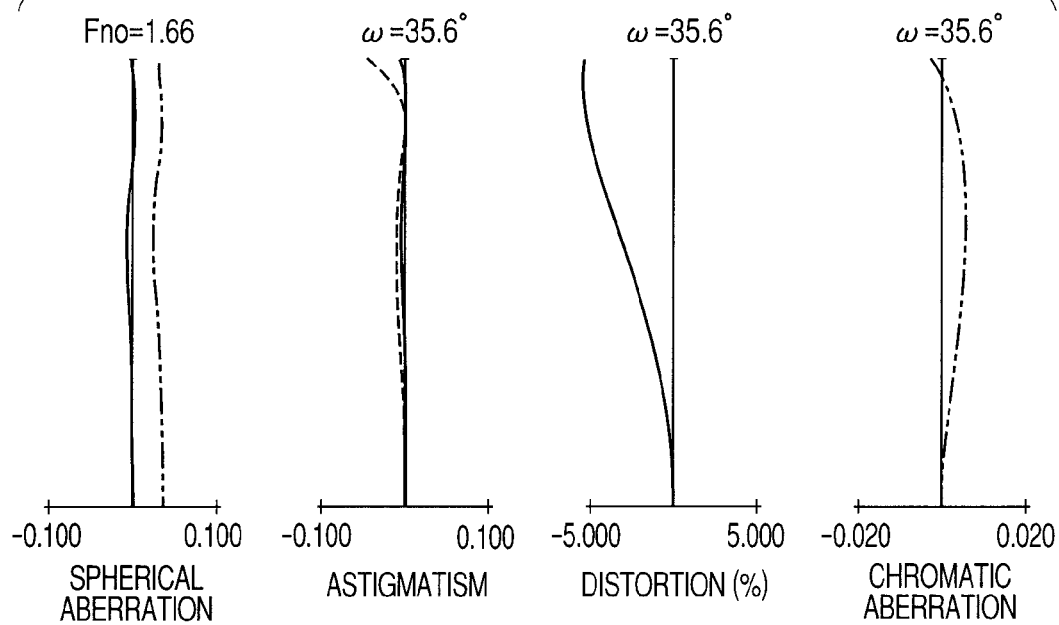
FIGS. 10A, 10B and 10C are aberration diagrams of the zoom lens system of the fifth embodiment of the present invention.
Figure 10B:
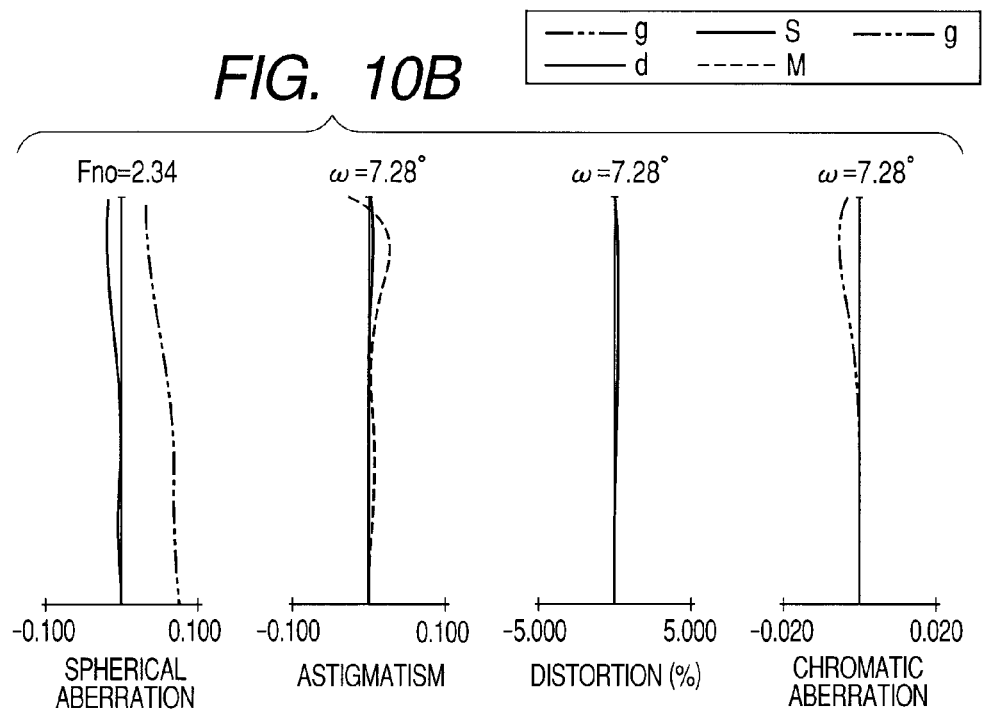
Figure 10C:
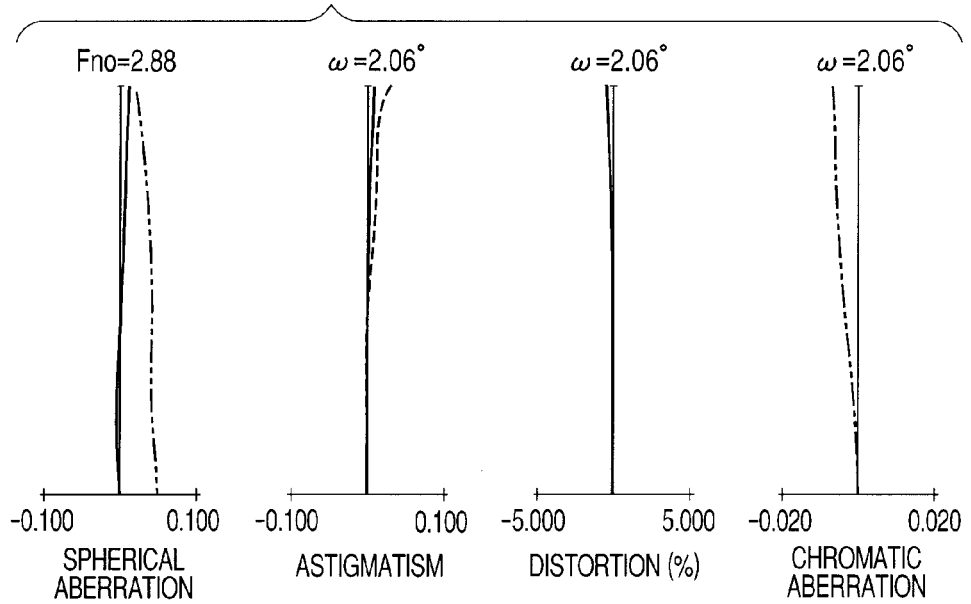
Figure 11:
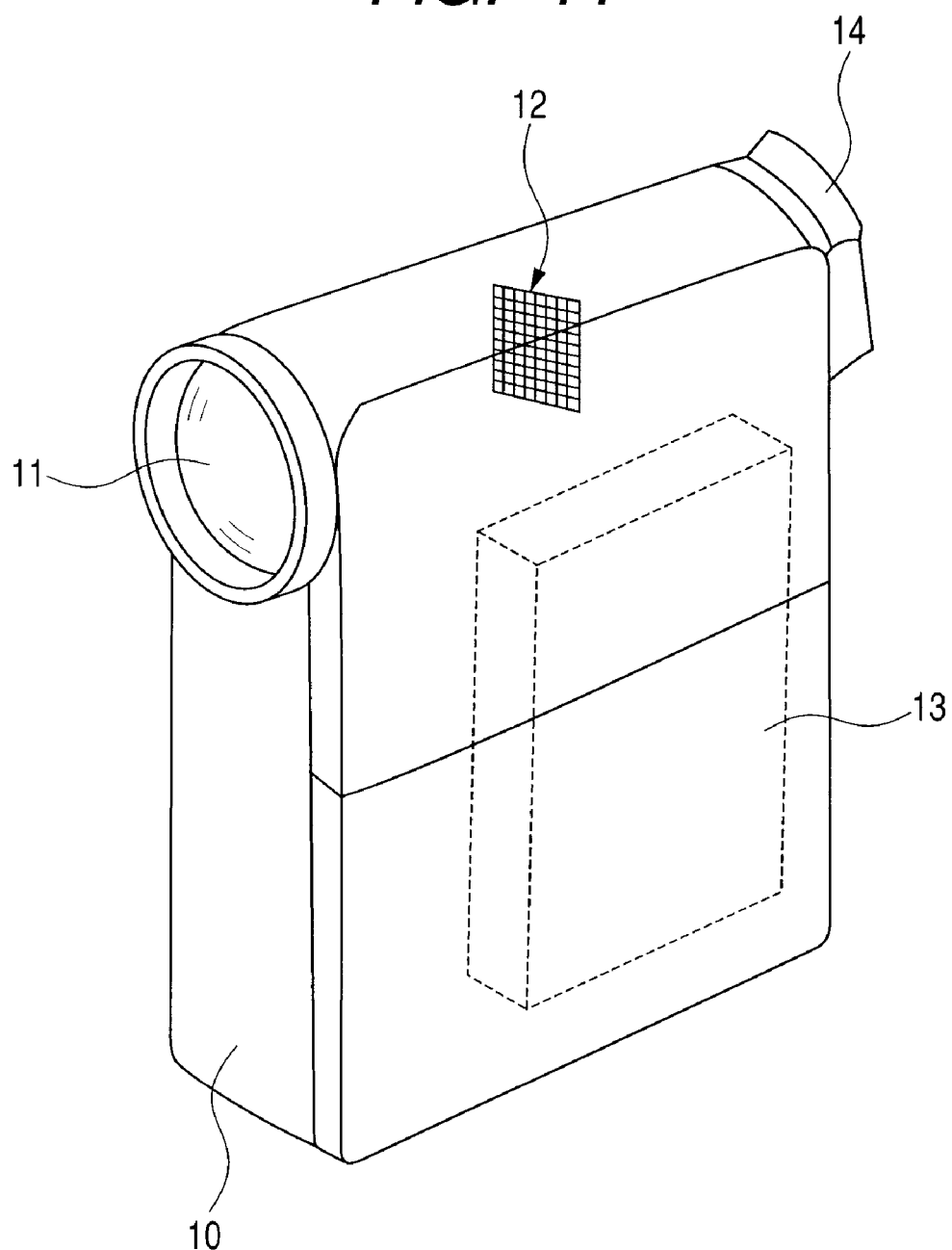
FIG. 11 is a schematic diagram illustrating a main portion of an image taking apparatus according to the present invention.

FIG. 1 is a lens sectional diagram at a wide angle end of a zoom lens system according to a first embodiment. FIGS. 2A, 2B, and 2C are aberration diagrams of the zoom lens system according to the first embodiment at the wide angle end (short-focal length end), an intermediate zoom position, and a telephoto end (long-focal length end), respectively, when focusing to an infinitely distant object. FIG. 3 is a lens sectional diagram at the wide angle end of a zoom lens system according to a second embodiment. FIGS. 4A, 4B, and 4C are aberration diagrams of the zoom lens system of the second embodiment at the wide angle end, the intermediate zoom position, and the telephoto end, respectively, when focusing to the infinitely distant object. FIG. 5 is a lens sectional diagram at the wide angle end of a zoom lens system according to a third embodiment. FIGS. 6A, 6B, and 6C are aberration diagrams of the zoom lens system of the third embodiment at the wide angle end, the intermediate zoom position, and the telephoto end, respectively, when focusing to the infinitely distant object. FIG. 7 is a lens sectional diagram at the wide angle end of a zoom lens system according to a fourth embodiment. FIGS. 8A, 8B, and 8C are aberration diagrams of the zoom lens system of the fourth embodiment at the wide angle end, the intermediate zoom position, and the telephoto end, respectively, when focusing to the infinitely distant object. FIG. 9 is a lens sectional diagram at the wide angle end of a zoom lens system according to a fifth embodiment. FIGS. 10A, 10B, and 10C are aberration diagrams of the zoom lens system of the fifth embodiment at the wide angle end, the intermediate zoom position, and the telephoto end, respectively, when focusing to the infinitely distant object. FIG. 11 is a schematic diagram illustrating a main portion of a video camera (image taking apparatus) which includes the zoom lens system of the present invention.

Each of the lens sectional diagrams illustrates a first lens unit B1 having a positive refractive power (optical power=inverse number of focal length), a second lens unit B2 having a negative refractive power, a third lens unit B3 having a positive refractive power, and a fourth lens unit B4 having a positive refractive power. The third lens unit B3 includes a third A lens unit B3A having a negative refractive power, and a third B lens unit B3B having a positive refractive power which is moved in a direction having a component in a direction perpendicular to the optical axis for image stabilization (for correcting the image blur). The movement for image stabilization may be swing (rotary movement) about a certain point on the optical axis as the center of rotation. The third B lens unit B3B for image stabilization is moved in the direction having the component in the direction perpendicular to the optical axis so that the imaging position may be moved on an image plane. An optical block G corresponds to an optical filter or a face plate, and indicates a fifth lens unit having no refractive power in numerical embodiments which are described later. An image plane IP is provided. When the zoom lens system is used as the photographing optical system of the video camera or the digital still camera, the image plane IP corresponds to an image taking surface of a solid state image pickup element (photoelectric transducer) such as a CCD sensor or a CMOS sensor. When the zoom lens system is used as the silver-halide film camera, the image plane IP corresponds to a film surface. An aperture stop SP is located on the object side of the third A lens unit B3A.

In the spherical aberration diagram, a solid line is a d-line and a two-dot chain line is a g-line. In the astigmatism diagram, a dotted line is a meridional image plane, and a solid line is a sagittal image plane. The lateral chromatic aberration is represented by the g-line. An F-number is represented by Fno, and a half field angle is represented by ω. In the respective following embodiments, the zoom positions at the wide angle end and the telephoto end are zoom positions where a zoom lens unit (second lens unit B2 in the respective embodiments) for magnification varying is located at both ends of a range in which the lens unit is mechanically movable on the optical axis.

In the respective embodiments, during zooming from the wide angle end toward the telephoto end, the second lens unit B2 is moved toward the image side to conduct magnification varying, and the image plane vibration caused by magnification varying is corrected by moving the fourth lens unit B4 toward the object side with a partial convex locus. There is applied a rear focus system in which the fourth lens unit B4 is moved on the optical axis to conduct focusing. A curve 4a indicated by a solid line and a curve 4b indicated by a dotted line of the fourth lens unit B4 are movement loci for correcting the image plane vibration during zooming from the wide angle end to the telephoto end when focusing is conducted on an infinitely distant object and a short-distance object, respectively. In this way, the fourth lens unit B4 is moved along the locus convex toward the object side to effectively use a space between the third lens unit B3 and the fourth lens unit B4 so that the entire length of the lens system is effectively reduced. The first lens unit B1 and the third lens unit B3 do not move for zooming and focusing.

In the respective embodiments, for example, when focusing is shifted from the infinitely distant object to the short-distance object at the telephoto end, the fourth lens unit B4 is moved to the object side as indicated by an arrow 4c. In the respective embodiments, the third B lens unit (image stabilization lens unit) B3B is moved in the direction having the component in the direction perpendicular to the optical axis to correct image blur when the entire optical system vibrates.

The zoom lens systems according to the respective embodiments are configured to provide lens units with the positive, negative, position, and positive refractive powers in order from the object side to the image side so as to obtain a high magnification-varying ratio (high zoom ratio) while keeping a wide field angle (photographing field angle) at the wide angle end. During zooming from the wide angle end toward the telephoto end, the second lens unit B2 and the fourth lens unit B4 are moved so as to maintain high performance while keeping the high zoom ratio, and realize the high zoom ratio by a reduced number of moving lens units.

In the respective embodiments, the first lens unit B1 includes a negative lens, a positive lens, a positive lens, and a positive lens. More specifically, the first lens unit B1 includes a negative lens, a positive lens having a biconvex shape, a positive lens having a shape convex toward the object side, and a positive lens having a meniscus shape that is convex toward the object side, which are arranged in order from the object side to the image side. The second lens unit B2 includes two negative lenses each having a meniscus shape that is concave toward the image side, a negative lens having a biconcave shape, and a positive lens having a biconvex shape, which are arranged in order from the object side to the image side. With such a lens configuration, the second lens unit B2 reduces the aberration variation during zooming. The third lens unit B3 includes one or more aspherical surface. In the third lens unit B3, particularly, an on-axis beam passes through a higher position at the wide angle end, and a spherical aberration and coma largely occur. For that reason, the aspherical surface is introduced to facilitate the effective aberration correction.

It is preferred that the third lens unit includes a lens whose object side surface and image side surface are aspherical. In the third lens unit B3, an off axis beam passes through a higher position in a zoom intermediate zone, and astigmatism and the curvature of field largely occur. For that reason, the aspherical surface is introduced to facilitate the effective aberration correction. Further, both surfaces of the lens are aspherical so that the aberration correction at the wide angle end and the aberration correction in the zoom intermediate zone described above are easily conducted simultaneously without increasing the number of aspherical lenses. The third lens unit B3 includes a third A lens unit B3A having a negative refractive power and a third B lens unit B3B having a positive refractive power which are arranged in order from the object side to the image side. With this configuration, the back focus with a sufficient length is ensured.

The third A lens unit B3A includes a cemented lens in which a negative lens and a biconvex positive lens are joined together, and a negative lens in order from the object side to the image side. Alternatively, the third A lens unit B3A includes a cemented lens in which a negative lens and a positive lens are joined together. Alternatively, the third A lens unit B3A includes a cemented lens in which a negative lens, a positive lens, and a negative lens are joined together. The third B lens unit B3B includes a positive lens having a lens surface of an aspherical shape, and a cemented lens in which a negative lens and a positive lens are joined together. Alternatively, the third B lens unit B3B includes a positive lens having a lens surface of an aspherical shape, and a cemented lens in which a positive lens and a negative lens are joined together. The third B lens unit B3B includes a negative lens and at least one positive lens, and includes an aspherical lens to excellently keep an aberration variation even during the image stabilizing operation. In this case, the shapes of the positive lens and the negative lens of the third B lens unit B3B are made appropriate to reduce a volume of the third B lens unit B3B, thus configuring a lightweight image stabilization lens unit.

The fourth lens unit B4 includes a positive lens, and a cemented lens of a negative lens and a positive lens in order from the object side. The fourth lens unit B4 includes one or more aspherical surfaces, and conducts focusing operation. With this lens configuration, the aberration variation occurring during the focusing operation is excellently corrected. It is preferred that the fourth lens unit B4 includes a lens whose object side surface and image side surface are aspherical. In the fourth lens unit B4, an off axis beam passes through a higher position at the telephoto end, and astigmatism and the curvature of field largely occur. For that reason, the aspherical surface is introduced to facilitate the effective aberration correction. Further, both surfaces of the lens are aspherical so that the correction of the aberration vibration during the focusing operation and the aberration correction at the telephoto end described above are easily conducted simultaneously without increasing the number of aspherical lenses.

As a specific lens configuration, the fourth lens unit B4 includes a positive lens having a biconvex shape, and a cemented lens in which a negative lens having a meniscus shape, which is concave toward the image side and a positive lens convex toward the object side are joined together. With this configuration, the aberration variation on focusing is reduced. In the zoom lens systems according to the respective embodiments, the third B lens unit B3B includes a cemented lens in which the positive lens and the negative lens are joined together. It is assumed that curvature radii of the surfaces of the cemented lens on the object side and the image side are R3A and R3B, respectively. In this case, the following conditional expression is satisfied.

$$5 < |(R3A+R3B)/(R3A-R3B)| < 30 \quad (1)$$

The third B lens unit B3B includes at least one positive lens and at least one negative lens, so as to suppress a variation of lateral chromatic aberration occurring during the image stabilizing operation. During zooming from the wide angle end to the telephoto end, when to realize a magnification varying mechanism in which the second lens unit B2 and the fourth lens unit B4 configure a moving lens unit, the entire lens system is liable to be upsized, and the image stabilization lens unit is also upsized. In the respective embodiments, the conditional expression (1) related to the configuration of the cemented lens in which the positive lens and the negative lens are joined together, which configures the third B lens unit B3B is satisfied, to thereby configure the image stabilization lens unit lighter in weight.

The conditional expression (1) relates to a difference between the curvature radius of the surface of the cemented lens on the object side and the curvature radius of the surface thereof on the image plane side in the third B lens unit B3B. When the difference falls below a lower limit of the conditional expression (1), the difference between the curvature radii of the lenses configuring the third B lens unit B3B is large, which means the cemented lens is a lens having a small curvature radius. When the curvature radius is small, in the case of the positive lens, the thickness of the lens is increased, and hence the volume of the lens is increased. Therefore, this is not preferred because the weight of the third B lens unit B3B which is the image stabilization lens unit is increased. Likewise, when the curvature radius of the negative lens is small, the volume of an edge portion of the lens is increased, and hence the weight of the third B lens unit B3B which is the image stabilization unit is increased, which is not preferred.

When the difference exceeds an upper limit of the conditional expression (1), a difference between the curvature radius of the surface of the cemented lens on the object side and the curvature radius of the surface thereof on the image plane side is small. When the difference between the curvature radius of the surface on the object side and the curvature radius of the surface on the image plane side is small, it is difficult to join the lenses, and a manufacture error increases, which is not preferred. In order to ensure the manufacturing stability while reducing the weight of the third B lens unit B3B, it is preferred that a numerical range of the conditional expression (1) satisfy the following conditional expression (1a).

$$8<|(R3A+R3B)/(R3A-R3B)|<26 \quad (1a)$$

Further, in the zoom lens systems of the respective embodiments, the third B lens unit B3B includes at least one positive lens, and a negative lens. The aperture stop SP is located on the object side of the third A lens unit B3A. It is assumed that the aperture diameter of the aperture stop at an open F-number at the wide angle end is Spa, and the total thickness of the positive lenses that configure the third B lens unit B3B is Dp. It is assumed that a total of the lens thicknesses at the height from the optical axis of the half of the aperture diameter of the aperture stop SP at the open F-number at the wide angle end of the negative lenses that configure the third B lens unit B3B is Kn. In this case, the following condition is satisfied.

$$0.4<(Dp+Kn)/Spa<0.7 \quad (2)$$

The conditional expression (2) relates to a total thickness of the positive lenses that configure the third B lens unit B3B, and the thickness of the edge portion of the negative lens. When the thickness exceeds an upper limit of the conditional expression (2), the volume of the lens of the third B lens unit B3B increases, that is, the weight is increased, which is not preferred. When the thickness falls below a lower limit thereof, the edge thickness of the positive lens that configures the third B lens unit B3B is reduced, or the center thickness of the negative lens is too thin to make manufacture difficult, which is not preferred. In order to ensure the manufacturing stability while reducing the weight of the third B lens unit B3B, it is more preferred that the numerical range of the conditional expression (2) satisfy the following conditional expression (2a).

$$0.44<(Dp+Kn)/Spa<0.60 \quad (2a)$$

With the above-mentioned configuration, in the respective embodiments, there may be obtained a zoom lens system that may reduce the image stabilization lens unit in size and weight while keeping the high zoom ratio.

Further, in order to maintain the excellent optical performance during the image stabilization while downsizing the image stabilization lens unit, it is preferred that at least one of the following conditional expressions is satisfied. According to this, the advantages are obtained according to the respective conditional expressions. It is assumed that focal lengths of the third A lens unit B3A and the third B lens unit B3B are f3A and f3B, respectively. It is assumed that a focal length of the third lens unit B3 is f3, and focal lengths of the entire system at the wide angle end and the telephoto end are fw and ft, respectively. It is assumed that a focal length of the first lens unit B1 is f1. It is assumed that the Abbe number of a material of one positive lens of the first lens unit B1 is ν1A, and the Abbe number of a material of another positive lens is ν1B. In this case, it is preferred that at least one of the following conditions be satisfied.

$$1.3<|f3A/f3B|<2.5 \quad (3)$$

Equation 2

$$3.0<f3/\sqrt{(fw \cdot ft)}<7.0 \quad (4).$$

$$0.7<f1/ft<1.0 \quad (5)$$

$$65<\nu1A<75 \quad (6)$$

$$70<\nu1B \quad (7)$$

The conditional expression (3) is for maintaining an appropriate image stabilizing action and a sufficiently high optical characteristic during the image stabilizing operation. The conditional expression (3) relates to a preferred range in the refractive powers of the two partial lens units within the third lens unit B3. When the refractive power exceeds an upper limit of the conditional expression (3), and the negative refractive power of the third A lens unit B3A becomes stronger, the effect of dividing the third lens unit B3 is reduced, and the action of the image stabilization is reduced, which are not preferred. When the image stabilizing action is reduced, the amount of moving the image stabilization lens unit must be increased during the image stabilizing operation as much. The space is widened by an increase in the amount of movement, and hence the image stabilization mechanism is increased in size, which is not preferred. When the amount of movement is further increased, the response speed and the controllability are deteriorated, which is not preferred.

When the refractive power falls below a lower limit of the conditional expression (3), in order to keep the third lens unit B3 to the positive refractive power as a whole, the positive refractive power of the third B lens unit B3B becomes too strong according to that refractive power, and the optical performance during the image stabilizing operation is deteriorated, which is not preferred. In order to keep the image stabilizing action and the optical characteristic during the image stabilizing operation, it is more preferred that the numerical range of the conditional expression (3) satisfy the following conditional expression (3a).

$$1.3<|f3A/f3B|<2.3 \quad (3a)$$

The other conditional expression (4) is for realizing the high performance while keeping the wide field angle and the high zoom ratio. The conditional expression (4) relates the zoom ratio (magnification varying ratio) and the aberration correction. When the value falls below a lower limit of the conditional expression (4), it is difficult to correct the aberration occurring in the third lens unit B3. In particular, in the third lens unit B3, the on-axis beam passes through the higher position, the spherical aberration greatly occurs, and the correction becomes difficult, which is not preferred. When the value exceeds an upper limit thereof, it is difficult to sufficiently take an interval on the optical axis between the third A lens unit B3A and the third B lens unit B3B which are two partial lens units that configure the third lens unit B3. When the interval is narrowed, it is difficult to provide a mechanism for the third B lens unit B3B so as to operate the image stabilization, which is not preferred. In order to keep a sufficient interval between the third A lens unit B3A and the third B lens unit B3B during location of the image stabilization mechanism while ensuring the high performance, it is more preferred that the numerical range of the conditional expression (4) satisfy the following conditional expression (4a).

Equation 3

$$3.6<f3/\sqrt{(fw \cdot ft)}<6.2 \quad (4a)$$

In order to achieve the high zoom ratio while keeping the high performance, it is preferred that the first lens unit include four lenses of a negative lens, a positive lens, a positive lens, and a positive lens. In this situation, it is preferred that the focal length f1 of the first lens unit B1 satisfy the conditional expression (5). The conditional expression (5) defines a preferred range of the refractive power of the first lens unit B1 by a ratio to the focal length of the entire system at the telephoto end. When the ratio falls below a lower limit of the conditional expression (5), the refractive power of the first lens unit B1 is too strong, the amount of occurrence of aberration in the first lens unit B1 becomes large, and particularly the curvature of field and the astigmatism greatly occur. In order to excellently correct the aberration, there is a need to increase the number of lenses, or add the aspherical surface. On the contrary, when the ratio exceeds an upper limit of the conditional expression (5), the aberration correction becomes easy, but the effective diameter of the first lens unit is increased, which is not preferred. It is more preferred that the numerical range of the conditional expression (5) be set to a numerical range of the following conditional expression (5a).

$$0.75 < f1/ft < 9.50 \tag{5a}$$

The conditional expressions (6) and (7) define a preferred range of the Abbe number of a glass material in any positive lens in the first lens unit B1. When the Abbe number falls below lower limits of the conditional expressions (6) and (7), it is difficult to excellently correct the lateral chromatic aberration and the on-axis chromatic aberration at the telephoto end. When the Abbe number exceeds those conditional expressions (6) and (7), and a glass material low in dispersion is used, the refractive index is also reduced, and it is difficult to correct the spherical aberration. It is more preferred that the numerical ranges of the conditional expressions (6) and (7) be set to numerical ranges of the following conditional expression (6a) and (7a).

$$67 < v1A < 72 \tag{6a}$$

$$80 < v1B \tag{7a}$$

As described above, according to the respective embodiments, there is realized a zoom lens system having high performance and excellent image stabilization function with the high zoom ratio of 18 to 20 while the field angle 2ω at the wide angle end is set to the wide field angle of 71 to 73 degrees. In the respective embodiments, a lens unit small in refractive power may be added to the object side of the first lens unit B1 or the image side of the fourth lens unit B4. Further, a teleconverter lens or a wide converter lens may be arranged on the object side or image side.

As described above, according to the respective embodiments, the refractive power arrangement of the respective lens units and the lens configuration of the respective lens units are appropriately set, and the third B lens unit B3B relatively small in size and light in weight, which configures a part of the optical system, forms the image stabilization lens unit. The third B lens unit B3B is moved in a direction having a component in a direction perpendicular to the optical axis to correct the image blur when the zoom lens system vibrates (tilts). As a result, there is obtained a zoom lens system that excellently corrects the decentering aberration when the lens unit is decentered while downsizing the entire optical system, simplifying the mechanism, and reducing a load of driving means.

First to fifth numerical embodiments corresponding to the first to fifth embodiments are described below. In the respective numerical embodiments, i indicates the order of planes from the object side, ri is the curvature radius of i-th (i-th plane), di is an interval between the i-th plane+1 plane, ndi and vdi are the refractive index and Abbe number of a material of the i-th optical member based on the d-line, respectively. In the first to fifth numerical embodiments, six planes closest to the image side correspond to planes corresponding to the optical blocks. It is assumed that in the aspherical configuration, a displacement at a position of the height H from the optical axis in the optical axial direction is X based on the plane apex. It is assumed that the traveling direction of light is positive, R is a radius of paraxial curvature, k is a conical constant, and A3 to A13 are aspherical coefficients, respectively. In this case, the displacement X is represented by the following expression.

$$X = \frac{\frac{H^2}{R}}{1 + \sqrt{1 - (1+k)\left(\frac{H}{R}\right)^2}} + A3H^3 + \tag{Equation 4}$$

$$A4H^4 + A5H^5 + A6H^6 + A7H^7 + A8H^8 +$$

$$A9H^9 + A10H^{10} + A11H^{11} + A12H^{12} + A13H^{13}$$

In the respective embodiments, terms having no description are 0 in A3 to A13. Symbol * means a surface having an aspherical shape. "e-x" means $10^{-x}$. A back focus in air calculation is represented by BF. A relationship between the above-mentioned respective conditional expressions and various numerical values in the numerical embodiments is shown in Table 1.

First Numerical Embodiment

| Unit mm | | | | |
|---|---|---|---|---|
| Surface data | | | | |
| Surface number | r | d | nd | vd |
| 1 | 277.697 | 3.20 | 1.84666 | 23.9 |
| 2 | 78.417 | 1.77 | | |
| 3 | 102.260 | 7.87 | 1.59319 | 67.9 |
| 4 | −473.342 | 0.20 | | |
| 5 | 59.147 | 8.61 | 1.49700 | 81.5 |
| 6 | 469.988 | 0.20 | | |
| 7 | 54.259 | 4.55 | 1.83481 | 42.7 |
| 8 | 112.224 | (Variable) | | |
| 9 | 64.116 | 1.15 | 2.00069 | 25.5 |
| 10 | 11.037 | 3.85 | | |
| 11 | 137.955 | 1.00 | 1.86400 | 40.6 |
| 12* | 30.493 | 2.64 | | |
| 13 | −26.474 | 0.85 | 1.77250 | 49.6 |
| 14 | 39.705 | 0.90 | | |
| 15 | 30.932 | 3.10 | 1.94595 | 18.0 |
| 16 | −56.563 | (Variable) | | |
| 17 (Stop) | ∞ | 2.73 | | |
| 18 | 80.052 | 0.80 | 1.88300 | 40.8 |
| 19 | 15.992 | 4.20 | 1.84666 | 23.9 |
| 20 | −25.691 | 0.17 | | |
| 21 | −22.044 | 0.80 | 2.00330 | 28.3 |
| 22 | 65.582 | 4.75 | | |
| 23* | 46.989 | 3.00 | 1.58313 | 59.4 |
| 24* | −28.227 | 0.20 | | |
| 25 | −275.075 | 0.80 | 1.80518 | 25.4 |
| 26 | 53.576 | 1.50 | 1.48749 | 70.2 |
| 27 | −254.230 | (Variable) | | |
| 28* | 29.675 | 3.60 | 1.58313 | 59.4 |
| 29* | −48.318 | 0.20 | | |
| 30 | 94.258 | 0.90 | 1.92286 | 18.9 |
| 31 | 28.823 | 3.50 | 1.51633 | 64.1 |

-continued

Unit mm

| | | | | |
|---|---|---|---|---|
| 32 | −38.371 | (Variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.50 | | |
| Image plane | ∞ | | | |

Aspherical surface data

Twelfth surface

K = −1.09914e+001  A4 = 5.66094e−005   A6 = −1.61718e−008
A8 = 1.63644e−009  A10 = −1.40944e−011  A12 = 2.00841e−013

Twenty-third surface

K = 1.71530e+000
A3 = 1.28672e−005  A5 = −2.15384e−006  A7 = −9.29422e−009
A9 = 4.82488e−011  A11 = −1.03291e−012

Twenty-fourth surface

K = −5.23637e+000
A3 = −3.21510e−006  A5 = −4.20683e−006  A7 = 2.25990e−008
A9 = −2.52983e−010

Twenty-eighth surface

K = −2.12081e−001  A4 = 1.86431e−005  A6 = −2.32517e−007
A8 = 1.73499e−009  A10 = 1.90953e−011

Twenty-ninth surface

K = −4.84583e+000  A4 = 3.10197e−005  A6 = −2.30980e−007
A8 = 2.05564e−009  A10 = 1.83243e−011

Various data

| | | | | | | |
|---|---|---|---|---|---|---|
| Zoom ratio | 19.98 | | | | | |
| Focal length | 4.23 | 23.78 | 84.45 | 7.87 | 45.71 | 6.10 |
| F-number | 1.66 | 2.34 | 2.88 | 1.81 | 2.65 | 1.72 |
| Field angle | 35.62 | 7.26 | 2.05 | 21.05 | 3.79 | 26.42 |
| Image height | 3.03 | 3.03 | 3.03 | 3.03 | 3.03 | 3.03 |
| Entire lens length | 152.41 | 152.41 | 152.41 | 152.41 | 152.41 | 152.41 |
| BF | 23.02 | 26.81 | 23.07 | 24.53 | 26.53 | 23.90 |
| d8 | 0.84 | 35.36 | 46.86 | 16.95 | 42.26 | 10.97 |
| d16 | 48.68 | 14.16 | 2.66 | 32.57 | 7.26 | 38.55 |
| d27 | 12.83 | 9.04 | 12.78 | 11.31 | 9.32 | 11.94 |
| d32 | 6.00 | 9.79 | 6.05 | 7.52 | 9.51 | 6.89 |

Zoom lens unit data

| Lens unit | First surface | Focal length |
|---|---|---|
| 1 | 1 | 66.36 |
| 2 | 9 | −10.81 |
| 3a | 18 | −55.57 |
| 3b | 23 | 38.67 |
| 4 | 28 | 25.63 |
| 5 | 33 | ∞ |

Second Numerical Embodiment

Unit mm

Surface data

| Surface number | r | d | nd | vd |
|---|---|---|---|---|
| 1 | 346.791 | 3.20 | 1.84666 | 23.9 |
| 2 | 79.138 | 1.96 | | |
| 3 | 106.540 | 7.87 | 1.56907 | 71.3 |
| 4 | −324.531 | 0.20 | | |
| 5 | 59.433 | 8.61 | 1.48749 | 70.2 |
| 6 | 451.612 | 0.20 | | |
| 7 | 54.040 | 4.55 | 1.83481 | 42.7 |
| 8 | 117.963 | (Variable) | | |
| 9 | 65.362 | 1.15 | 2.00069 | 25.5 |
| 10 | 10.694 | 3.89 | | |
| 11 | 103.693 | 1.00 | 1.86400 | 40.6 |
| 12* | 30.808 | 2.28 | | |
| 13 | −26.912 | 0.85 | 1.77250 | 49.6 |
| 14 | 36.434 | 1.09 | | |
| 15 | 31.195 | 3.10 | 1.94595 | 18.0 |
| 16 | −53.422 | (Variable) | | |
| 17 (Stop) | ∞ | 2.73 | | |
| 18 | 91.770 | 0.80 | 1.88300 | 40.8 |
| 19 | 15.517 | 4.20 | 1.84666 | 23.9 |
| 20 | −25.464 | 0.15 | | |
| 21 | −22.326 | 0.80 | 2.00330 | 28.3 |
| 22 | 67.217 | 4.75 | | |
| 23* | 47.140 | 3.00 | 1.58313 | 59.4 |
| 24* | −26.349 | 0.20 | | |
| 25 | −204.114 | 1.50 | 1.48749 | 70.2 |
| 26 | −34.133 | 0.50 | 1.80518 | 25.4 |
| 27 | −235.983 | (Variable) | | |
| 28* | 30.388 | 3.60 | 1.58313 | 59.4 |
| 29* | −48.342 | 0.20 | | |
| 30 | 89.777 | 0.90 | 1.92286 | 18.9 |
| 31 | 28.686 | 3.50 | 1.51633 | 64.1 |
| 32 | −37.298 | (Variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.50 | | |
| Image plane | ∞ | | | |

Aspherical surface data

Twelfth surface

K = −1.61035e+001  A4 = 6.63311e−005  A6 = −1.31635e−007
A8 = −3.41046e−009  A10 = 5.17685e−011  A12 = −1.05754e−014

Twenty-third surface

K = 6.01552e+000
A3 = 1.79683e−005  A5 = −2.14638e−006  A7 = −5.35794e−009
A9 = 2.06751e−010  A11 = −1.24056e−012

Twenty-fourth surface

K = −4.77821e+000
A3 = 5.27602e−006  A5 = −3.80480e−006  A7 = 2.40140e−008
A9 = −8.21649e−011

Twenty-eighth surface

K = −2.61498e−002  A4 = 1.95919e−005  A6 = −2.23737e−007
A8 = 1.72892e−009  A10 = 2.17463e−011

Twenty-ninth surface

K = −8.00470e+000  A4 = 2.97023e−005  A6 = −2.11847e−007
A8 = 2.02969e−009  A10 = 2.15789e−011

Various data

| | | | | | | |
|---|---|---|---|---|---|---|
| Zoom ratio | 17.95 | | | | | |
| Focal length | 4.10 | 22.33 | 73.61 | 7.57 | 41.82 | 5.89 |
| F-number | 1.66 | 2.34 | 2.88 | 1.81 | 2.65 | 1.72 |
| Field angle | 36.46 | 7.73 | 2.36 | 21.80 | 4.14 | 27.22 |
| Image height | 3.03 | 3.03 | 3.03 | 3.03 | 3.03 | 3.03 |
| Entire lens length | 152.49 | 152.49 | 152.49 | 152.49 | 152.49 | 152.49 |
| BF | 22.86 | 26.68 | 24.20 | 24.35 | 26.71 | 23.72 |
| d8 | 0.82 | 35.75 | 47.39 | 17.12 | 42.74 | 11.07 |
| d16 | 48.95 | 14.02 | 2.38 | 32.65 | 7.03 | 38.70 |
| d27 | 13.09 | 9.27 | 11.74 | 11.60 | 9.24 | 12.22 |
| d32 | 5.84 | 9.66 | 7.19 | 7.33 | 9.69 | 6.71 |

-continued

Unit mm

Zoom lens unit data

| Lens unit | First surface | Focal length |
|---|---|---|
| 1 | 1 | 66.92 |
| 2 | 9 | −10.90 |
| 3a | 18 | −54.19 |
| 3b | 23 | 38.29 |
| 4 | 28 | 25.44 |
| 5 | 33 | ∞ |

Third Numerical Embodiment

Unit mm

Surface data

| Surface number | r | d | nd | vd |
|---|---|---|---|---|
| 1 | 279.602 | 3.20 | 1.84666 | 23.9 |
| 2 | 78.619 | 1.80 | | |
| 3 | 103.422 | 7.85 | 1.59319 | 67.9 |
| 4 | −481.133 | 0.20 | | |
| 5 | 58.971 | 8.60 | 1.49700 | 81.5 |
| 6 | 500.860 | 0.20 | | |
| 7 | 54.232 | 4.55 | 1.83481 | 42.7 |
| 8 | 110.949 | (Variable) | | |
| 9 | 68.002 | 1.15 | 2.00069 | 25.5 |
| 10 | 10.980 | 3.85 | | |
| 11 | 125.053 | 1.00 | 1.85135 | 40.1 |
| 12* | 29.719 | 2.67 | | |
| 13 | −26.734 | 0.85 | 1.77250 | 49.6 |
| 14 | 41.825 | 0.84 | | |
| 15 | 31.046 | 3.10 | 1.94595 | 18.0 |
| 16 | −54.861 | (Variable) | | |
| 17 (Stop) | ∞ | 2.53 | | |
| 18 | 89.460 | 0.80 | 1.88300 | 40.8 |
| 19 | 15.461 | 4.20 | 1.84666 | 23.9 |
| 20 | −25.269 | 0.14 | | |
| 21 | −22.185 | 0.80 | 2.00330 | 28.3 |
| 22 | 66.393 | 4.75 | | |
| 23* | 46.529 | 3.60 | 1.58313 | 59.4 |
| 24* | −26.933 | 0.20 | | |
| 25 | −203.745 | 2.00 | 1.48749 | 70.2 |
| 26 | −34.732 | 0.80 | 1.80518 | 25.4 |
| 27 | −229.502 | (Variable) | | |
| 28* | 30.580 | 3.60 | 1.58313 | 59.4 |
| 29* | −48.480 | 0.20 | | |
| 30 | 90.028 | 0.90 | 1.92286 | 18.9 |
| 31 | 28.776 | 3.50 | 1.51633 | 64.1 |
| 32 | −37.052 | (Variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.52 | | |
| Image plane | ∞ | | | |

Aspherical surface data

Twelfth surface

K = −2.09315e+001  A4 = 1.06195e−004  A6 = −8.10904e−007
A8 = 7.60130e−009  A10 = 3.21857e−012  A12 = −2.83689e−013

Twenty-third surface

K = 2.10328e+000
A3 = 2.06948e−005  A5 = −1.91231e−006  A7 = −8.07340e−010
A9 = 1.89205e−010  A11 = −1.20487e−012

Twenty-fourth surface

K = −4.75167e+000
A3 = 8.42353e−007  A5 = −3.97374e−006  A7 = 2.93971e−008
A9 = −1.04352e−010

Twenty-eighth surface

K = 9.42037e−002  A4 = 1.84021e−005  A6 = −2.55342e−007
A8 = 3.04586e−009  A10 = 1.12969e−011

Twenty-ninth surface

K = −6.51874e+000  A4 = 3.09390e−005  A6 = −2.38880e−007
A8 = 3.19270e−009  A10 = 1.17773e−011

Various data

| Zoom ratio | 17.92 | | | | | |
|---|---|---|---|---|---|---|
| Focal length | 4.24 | 22.92 | 75.94 | 7.81 | 42.88 | 6.08 |
| F-number | 1.66 | 2.34 | 2.88 | 1.81 | 2.65 | 1.72 |
| Field angle | 35.56 | 7.53 | 2.28 | 21.20 | 4.04 | 26.49 |
| Image height | 3.03 | 3.03 | 3.03 | 3.03 | 3.03 | 3.03 |
| Entire lens length | 152.60 | 152.60 | 152.60 | 152.60 | 152.60 | 152.60 |
| BF | 22.95 | 26.63 | 23.78 | 24.42 | 26.51 | 23.81 |
| d8 | 0.86 | 35.06 | 46.46 | 16.82 | 41.90 | 10.89 |
| d16 | 48.35 | 14.15 | 2.75 | 32.39 | 7.31 | 38.31 |
| d27 | 12.58 | 8.90 | 11.74 | 11.11 | 9.02 | 11.72 |
| d32 | 5.91 | 9.59 | 6.75 | 7.38 | 9.47 | 6.77 |

Zoom lens unit data

| Lens unit | First surface | Focal length |
|---|---|---|
| 1 | 1 | 66.58 |
| 2 | 9 | −10.95 |
| 3a | 18 | −54.34 |
| 3b | 23 | 38.43 |
| 4 | 28 | 25.47 |
| 5 | 33 | ∞ |

Fourth Numerical Embodiment

Unit mm

Surface data

| Surface number | r | d | nd | vd |
|---|---|---|---|---|
| 1 | 318.192 | 3.20 | 1.84666 | 23.9 |
| 2 | 81.838 | 1.60 | | |
| 3 | 103.621 | 8.21 | 1.59319 | 67.9 |
| 4 | −408.911 | 0.20 | | |
| 5 | 60.968 | 8.25 | 1.49700 | 81.5 |
| 6 | 410.702 | 0.20 | | |
| 7 | 55.573 | 4.55 | 1.80610 | 40.9 |
| 8 | 116.205 | (Variable) | | |
| 9 | 55.879 | 1.15 | 2.00069 | 25.5 |
| 10 | 11.210 | 3.62 | | |
| 11 | 66.922 | 1.00 | 1.80400 | 46.6 |
| 12* | 29.147 | 2.78 | | |
| 13 | −23.575 | 0.85 | 1.77250 | 49.6 |
| 14 | 31.599 | 0.95 | | |
| 15 | 29.879 | 3.10 | 1.94595 | 18.0 |
| 16 | −59.943 | (Variable) | | |
| 17 (Stop) | ∞ | 2.73 | | |
| 18 | 1676.905 | 0.80 | 1.88300 | 40.8 |
| 19 | 18.255 | 4.20 | 1.84666 | 23.9 |
| 20 | 91.810 | 4.75 | | |
| 21* | 41.727 | 3.00 | 1.58313 | 59.4 |
| 22* | −29.953 | 0.20 | | |
| 23 | −78.632 | 2.00 | 1.48749 | 70.2 |

-continued

Unit mm

| | | | | |
|---|---|---|---|---|
| 24 | −28.539 | 0.80 | 1.80518 | 25.4 |
| 25 | −96.230 | (Variable) | | |
| 26* | 31.021 | 3.60 | 1.58313 | 59.4 |
| 27* | −60.209 | 0.20 | | |
| 28 | 106.902 | 0.90 | 1.92286 | 18.9 |
| 29 | 31.816 | 3.50 | 1.51633 | 64.1 |
| 30 | −34.404 | (Variable) | | |
| 31 | ∞ | 0.80 | 1.52420 | 60.0 |
| 32 | ∞ | 2.43 | 1.54400 | 70.0 |
| 33 | ∞ | 1.50 | | |
| 34 | ∞ | 20.00 | 1.58913 | 61.1 |
| 35 | ∞ | 0.50 | 1.49831 | 65.1 |
| 36 | ∞ | 0.65 | | |
| Image plane | ∞ | | | |

Aspherical surface data

Twelfth surface

K = −1.09079e+001  A4 = 5.97984e−005  A6 = 3.44579e−008
A8 = −3.61701e−010  A10 = 1.53859e−012  A12 = 3.22391e−013

Twenty-first surface

K = 1.56706e+000
A3 = −2.66035e−006  A5 = −3.41203e−006  A7 = 1.42072e−009
A9 = −1.58415e−010  A11 = −1.82717e−012

Twenty-second surface

K = −6.59381e+000
A3 = −1.75165e−005  A5 = −5.20045e−006  A7 = 3.76211e−008
A9 = −5.37822e−010

Twenty-sixth surface

K = −7.08687e−002  A4 = 2.56548e−005  A6 = −1.71741e−007
A8 = 2.17766e−009  A10 = 2.83959e−011

Twenty-seventh surface

K = −5.67683e+000  A4 = 4.28424e−005  A6 = −1.94968e−007
A8 = 2.51556e−009  A10 = 3.35745e−011

Various data

| Zoom ratio | 18.02 | | | | | |
|---|---|---|---|---|---|---|
| Focal length | 4.28 | 23.03 | 77.12 | 7.86 | 43.29 | 6.13 |
| F-number | 1.66 | 2.34 | 2.88 | 1.81 | 2.65 | 1.72 |
| Field angle | 35.29 | 7.49 | 2.25 | 21.08 | 4.00 | 26.31 |
| Image height | 3.03 | 3.03 | 3.03 | 3.03 | 3.03 | 3.03 |
| Entire lens length | 153.76 | 153.76 | 153.76 | 153.76 | 153.76 | 153.76 |
| BF | 20.87 | 25.10 | 22.85 | 22.52 | 25.28 | 21.84 |
| d8 | 0.85 | 36.41 | 48.26 | 17.44 | 43.52 | 11.28 |
| d16 | 49.95 | 14.39 | 2.54 | 33.35 | 7.28 | 39.52 |
| d25 | 15.75 | 11.52 | 13.77 | 14.09 | 11.34 | 14.78 |
| d30 | 3.70 | 7.93 | 5.68 | 5.35 | 8.11 | 4.67 |

Zoom lens unit data

| Lens unit | First surface | Focal length |
|---|---|---|
| 1 | 1 | 69.23 |
| 2 | 9 | −10.77 |
| 3a | 18 | −93.34 |
| 3b | 21 | 41.15 |
| 4 | 26 | 26.65 |
| 5 | 31 | ∞ |

Fifth Numerical Embodiment

Unit mm

Surface data

| Surface number | r | d | nd | vd |
|---|---|---|---|---|
| 1 | 306.011 | 3.20 | 1.84666 | 23.9 |
| 2 | 80.780 | 1.61 | | |
| 3 | 103.370 | 7.87 | 1.59319 | 67.9 |
| 4 | −420.277 | 0.20 | | |
| 5 | 59.881 | 8.61 | 1.49700 | 81.5 |
| 6 | 459.025 | 0.20 | | |
| 7 | 54.008 | 4.55 | 1.83481 | 42.7 |
| 8 | 108.629 | (Variable) | | |
| 9 | 67.833 | 1.15 | 2.00069 | 25.5 |
| 10 | 10.783 | 3.90 | | |
| 11 | 118.264 | 1.00 | 1.86400 | 40.6 |
| 12* | 30.370 | 2.39 | | |
| 13 | −29.043 | 0.85 | 1.77250 | 49.6 |
| 14 | 34.993 | 0.78 | | |
| 15 | 28.091 | 3.10 | 1.94595 | 18.0 |
| 16 | −59.090 | (Variable) | | |
| 17 (Stop) | ∞ | 2.73 | | |
| 18 | 89.649 | 0.80 | 1.88300 | 40.8 |
| 19 | 19.442 | 4.20 | 1.84666 | 23.9 |
| 20 | −15.026 | 0.80 | 2.00330 | 28.3 |
| 21 | 66.525 | 4.75 | | |
| 22* | 46.261 | 3.80 | 1.58313 | 59.4 |
| 23* | −26.727 | 0.20 | | |
| 24 | −188.475 | 2.00 | 1.48749 | 70.2 |
| 25 | −34.798 | 0.80 | 1.80518 | 25.4 |
| 26 | −240.893 | (Variable) | | |
| 27* | 30.582 | 3.60 | 1.58313 | 59.4 |
| 28* | −49.700 | 0.20 | | |
| 29 | 90.894 | 0.90 | 1.92286 | 18.9 |
| 30 | 28.619 | 3.50 | 1.51633 | 64.1 |
| 31 | −37.266 | (Variable) | | |
| 32 | ∞ | 0.80 | 1.52420 | 60.0 |
| 33 | ∞ | 2.43 | 1.54400 | 70.0 |
| 34 | ∞ | 1.50 | | |
| 35 | ∞ | 20.00 | 1.58913 | 61.1 |
| 36 | ∞ | 0.50 | 1.49831 | 65.1 |
| 37 | ∞ | 0.50 | | |
| Image plane | ∞ | | | |

Aspherical surface data

Twelfth surface

K = −1.16571e+001  A4 = 5.68030e−005  A6 = −1.22379e−007
A8 = 1.89826e−009  A10 = −5.02704e−012  A12 = 7.81404e−014

Twenty-second surface

K = 4.08781e+000
A3 = 2.54702e−005  A5 = −2.29925e−006  A7 = −2.27696e−009
A9 = 1.72745e−010  A11 = −1.01287e−012

Twenty-third surface

K = −5.08368e+000
A3 = 6.93284e−006  A5 = −3.98105e−006  A7 = 2.52038e−008
A9 = −8.35178e−011

Twenty-seventh surface

K = −1.66559e−001  A4 = 2.11328e−005  A6 = −2.23303e−007
A8 = 1.90708e−009  A10 = 2.13572e−011

Twenty-eighth surface

K = −7.41362e+000  A4 = 3.08633e−005  A6 = −2.11300e−007
A8 = 2.17911e−009  A10 = 2.15787e−011

Various data

| Zoom ratio | 19.97 | | | | | |
|---|---|---|---|---|---|---|
| Focal length | 4.23 | 23.73 | 84.40 | 7.86 | 45.62 | 6.09 |
| F-number | 1.66 | 2.34 | 2.88 | 1.81 | 2.65 | 1.72 |
| Field angle | 35.62 | 7.28 | 2.06 | 21.07 | 3.80 | 26.43 |

-continued

| | | | Unit mm | | | |
|---|---|---|---|---|---|---|
| Image height | 3.03 | 3.03 | 3.03 | 3.03 | 3.03 | 3.03 |
| Entire lens length | 152.97 | 152.97 | 152.97 | 152.97 | 152.97 | 152.97 |
| BF | 22.51 | 26.30 | 22.68 | 24.03 | 26.06 | 23.40 |
| d8 | 0.88 | 35.83 | 47.48 | 17.19 | 42.82 | 11.13 |
| d16 | 49.08 | 14.13 | 2.48 | 32.77 | 7.14 | 38.83 |
| d26 | 12.79 | 9.00 | 12.62 | 11.28 | 9.24 | 11.90 |
| d31 | 5.49 | 9.28 | 5.66 | 7.01 | 9.04 | 6.38 |

Zoom lens unit data

| Lens unit | First surface | Focal length |
|---|---|---|
| 1 | 1 | 67.13 |
| 2 | 9 | −10.90 |
| 3a | 18 | −58.96 |
| 3b | 22 | 38.60 |
| 4 | 27 | 25.80 |
| 5 | 32 | ∞ |

TABLE 1

Conditional expression correspondence values in respective embodiments

| | First embodiment | Second embodiment | Third embodiment | Fourth embodiment | Fifth embodiment |
|---|---|---|---|---|---|
| fw | 4.23 | 4.10 | 4.24 | 4.28 | 4.23 |
| ft | 84.45 | 73.61 | 75.94 | 77.12 | 84.40 |
| f1 | 66.36 | 66.92 | 66.58 | 69.23 | 67.13 |
| f3A | −55.57 | −54.19 | −54.34 | −93.34 | −58.96 |
| f3B | 38.67 | 38.29 | 38.43 | 41.15 | 38.60 |
| f3 | 102.73 | 103.43 | 103.50 | 66.26 | 91.76 |
| R3A | −275.08 | −204.11 | −203.75 | −78.63 | −188.47 |
| R3B | −254.23 | −235.98 | −229.50 | −96.23 | −240.89 |
| (1) |(R3A + R3B)/(R3A − R3B)| | 25.39 | 13.81 | 16.82 | 9.94 | 8.19 |
| Spa | 12.63 | 12.53 | 12.52 | 13.04 | 12.61 |
| Dp | 4.50 | 4.50 | 5.60 | 5.00 | 5.80 |
| Kn | 1.25 | 1.00 | 1.28 | 1.33 | 1.29 |
| (2) (Dp + Kn)/Spa | 0.46 | 0.44 | 0.55 | 0.49 | 0.56 |
| (3) |f3A/f3B| | 1.44 | 1.42 | 1.41 | 2.27 | 1.53 |
| (4) f3t/(fw · ft) | 5.44 | 5.95 | 5.77 | 3.65 | 4.86 |
| (5) f1/ft | 0.79 | 0.91 | 0.88 | 0.90 | 0.80 |
| (6) V1A | 67.90 | 71.30 | 67.90 | 67.90 | 67.90 |
| (7) V1B | 81.54 | 70.23 | 81.54 | 81.54 | 81.54 |

Next, a video camera according to an embodiment of the present invention in which the zoom lens system according to any one of the embodiments described above is used as a photographing optical system is described with reference to FIG. 11. In FIG. 11, the video camera includes a video camera main body 10 and a photographing optical system 11 including the zoom lens system described in any one of the embodiments described above. A solid state image pickup element (photoelectric transducer) 12 such as a CCD sensor or a CMOS sensor receives light of an object image formed by the photographing optical system 11. A memory 13 records information corresponding to the object image photoelectrically converted by the solid state image pickup element 12. A finder 14 is used for observing the object image displayed on a display element (not shown). The zoom lens system according to any one of the embodiments of the present invention is applied to an image taking apparatus such as the video camera, whereby a small image taking apparatus having high optical performance may be realized. Note that the zoom lens system according to any one of the embodiments of the present invention may be applied to a digital still camera similarly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-085556, filed Mar. 31, 2009, which is hereby incorporated by reference herein in its entirety.

What is claimed is:

1. A zoom lens system, comprising, in order from an object side to an image side:

a first lens unit having a positive refractive power;

a second lens unit having a negative refractive power;

a third lens unit having a positive refractive power; and a fourth lens unit having a positive refractive power, the second lens unit and the fourth lens unit moving along an optical axis during zooming, wherein:

the third lens unit comprises, in order from the object side to the image side:

an aperture stop;

a first lens subunit having a negative refractive power; and a second lens subunit having a positive refractive power which moves in a direction having a component in a direction perpendicular to the optical axis for moving an imaging position;

the second lens subunit comprises a cemented lens in which a positive lens and a negative lens are joined together; and when curvature radii of surfaces of the cemented lens on the object side and the image side are R3A and R3B, respectively, a maximum aperture diameter of the aperture stop is Spa, a total thickness on the optical axis of the positive lenses configuring the second lens subunit is Dp, a total of lens thicknesses at a height from the optical axis of a half of the maximum aperture diameter of the negative lens that configures the second lens subunit at the wide angle end is Kn, a focal length of the third lens unit is f3, and focal lengths of an entire system at a wide angle end and a telephoto end are fw and ft, respectively, the following conditions are satisfied $$5<|(R3A+R3B)/(R3A-R3B)|<30,$$

$$0.44<(Dp+Kn)/Spa<0.60, \text{ and}$$

$$3.6<f3/\sqrt{(fw \cdot ft)}<6.2.$$

2. A zoom lens system according to claim 1, wherein when focal lengths of the first lens subunit and the second lens subunit are f3A and f3B, respectively, the following condition is satisfied $$1.3<|f3A/f3B|<2.5.$$

3. A zoom lens system according to claim 1, wherein:
the first lens unit comprises a negative lens, a positive lens, a positive lens, and a positive lens in order from the object side to the image side; and
when a focal length of the first lens unit is f1, a focal length of an entire system at the telephoto end is ft, an Abbe number of a material of one positive lens in the first lens unit is v1A, and an Abbe number of a material of another positive lens in the first lens unit is v1B, the following conditions are satisfied $$0.7<f1/ft<1.0$$

$$65<v1A<75$$

$$70<v1B.$$

4. A zoom lens system according to claim 1, wherein the fourth lens unit comprises a positive lens on the object side, and a cemented lens in which a negative lens and a positive lens are joined together on the image side.

5. An image taking apparatus, comprising:
a zoom lens system; and
a solid state image pickup element that receives light of an image formed by the zoom lens system,
the zoom lens system comprising, in order from an object side to an image side,
a first lens unit having a positive refractive power;
a second lens unit having a negative refractive power;
a third lens unit having a positive refractive power; and
a fourth lens unit having a positive refractive power,
the second lens unit and the fourth lens unit moving along an optical axis during zooming, wherein:
the third lens unit comprises, in order from the object side to the image side:
an aperture stop;
a first lens subunit having a negative refractive power; and
a second lens subunit having a positive refractive power which moves in a direction having a component in a direction perpendicular to the optical axis for moving an imaging position;
the second lens subunit comprises a cemented lens in which a positive lens and a negative lens are joined together; and
when curvature radii of surfaces of the cemented lens on the object side and the image side are R3A and R3B, respectively, a maximum aperture diameter of the aperture stop is Spa, a total thickness on the optical axis of the positive lenses configuring the second lens subunit is Dp, a total of lens thicknesses at a height from the optical axis of a half of the maximum aperture diameter of the negative lens that configures the second lens subunit at the wide angle end is Kn, a focal length of the third lens unit is f3, and focal lengths of an entire system at a wide angle end and a telephoto end are fw and ft, respectively, the following conditions are satisfied $$5<|(R3A+R3B)/(R3A-R3B)|<30,$$

$$0.44<(Dp+Kn)/Spa<0.60, \text{ and}$$

$$3.6<f3/\sqrt{(fw \cdot ft)}<6.2.$$

* * * * *